(No Model.)
J. P. LAVIGNE.
BICYCLE TIRE.
No. 490,830. Patented Jan. 31, 1893.
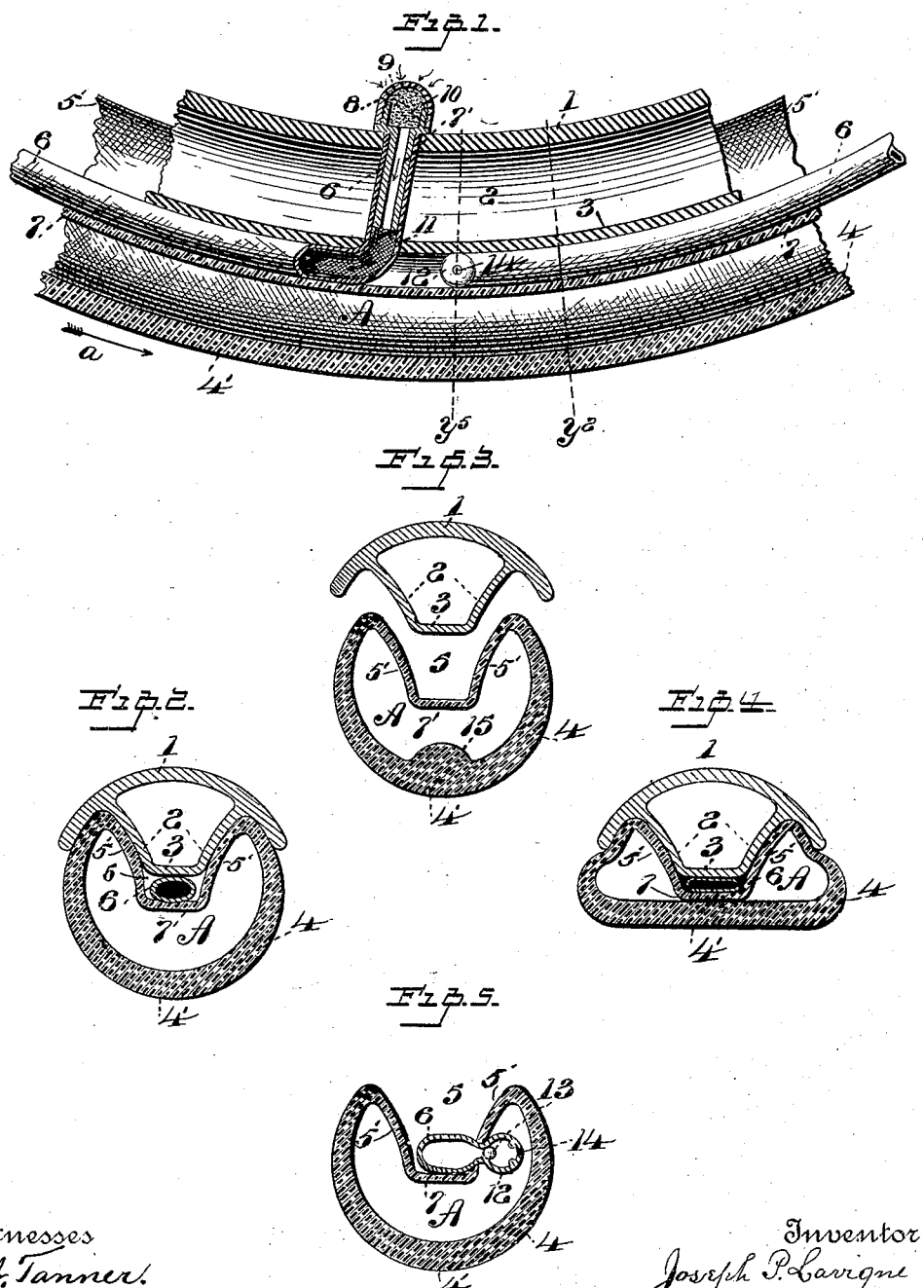
Witnesses
A. J. Tanner
L. K. Hoyt
Inventor
Joseph P. Lavigne
By Geo. O. Phillips
his Attorney

UNITED STATES PATENT OFFICE.

JOSEPH P. LAVIGNE, OF NEW HAVEN, CONNECTICUT, ASSIGNOR OF ONE-HALF TO REUBEN H. BROWN, OF SAME PLACE.

BICYCLE-TIRE.

SPECIFICATION forming part of Letters Patent No. 490,830, dated January 31, 1893.

Application filed July 7, 1892. Serial No. 439,230. (No model.)

*To all whom it may concern:*

Be it known that I, JOSEPH P. LAVIGNE, a citizen of the United States, and a resident of New Haven, in the county of New Haven and State of Connecticut, have invented certain new and useful Improvements in Bicycles, of which the following is a specification.

My invention relates to bicycles using pneumatic tires and particularly to an improved device for maintaining the normal pressure in the tire and to operate such device by means of the yielding or flexible action of the tire due to traction.

To this end my invention consists in the use of a flexible tube preferably located between the rim and tire and within convenient reach to be acted upon by that portion inwardly depressed by traction. Said tube arranged circumferentially about the tire; one end open to the atmosphere, the other or discharging end, opening within the cavity of the tire, so that, when the tube is compressed air may be forced therein, as fully set forth in the following specification and such characteristic features as I believe to be new and novel, particularly pointed out in the claims to follow.

To enable others skilled in the art to readily understand my invention, reference is had to the accompanying drawings and to the figures and letters of reference marked thereon, in which;

Figure 1, represents a broken section of the tire, rim and flexible air tube, central sectional view of the tire, rim and outer nozzle end of the tube, showing also a broken sectional view of a portion of said tube. Fig. 2, is a transverse sectional elevation of the rim, tire, and air tube, through line $y^2$ of Fig. 1. Fig. 3, is a transverse sectional elevation of the rim and tire, showing the latter detached therefrom. Fig. 4, is a transverse sectional elevation of the rim, tire, and air tube, showing the tire and tube compressed. Fig. 5, is a transverse sectional elevation of the tire, and outlet valve end of the air tube, through line $y^5$ of Fig. 1.

Its construction and operation are as follows;

1 2, and 3, form the four sides of a tubular rim, the concavo convex side 1, being that portion to which the spokes of the wheel are attached, while the sides 2, and 3 are projected above the outer convex surface of the side 1, thus forming a raised projection or angular shaped rib extending circumferentially about the same.

4 is the pneumatic tire having the groove 5 in one side to receive the rib of the rim, and the rubber air tube 6 placed between the bottom 7, of said groove, and the top portion of the rib, one end of the tube 6 is turned at right angles and projects through the metal rim, and has inserted in such end the air nozzle 7, whose cap 8, is perforated with holes 9, for the admission of air to the tube.

10 represents felt or other packing for the exclusion of dust.

11 is a flap valve in the lower end of the nozzle in the tube 6.

12 is the valve placed at the discharge end of tube 6, which projects through one of the sides 2 of the rib portion of the tire; 13 is a ball in said valve end which closes or opens communication between the cavity A of the tire, and rubber tube.

Ordinarily the normal working pressure sought to be maintained is about forty pounds, being not quite three atmospheres. This amount gives the best results, enabling the outer surface to be sufficiently depressed to afford good traction without unduly straining the tire. This depressible feature of the tire, I employ to compress the rubber tube sufficient to raise the normal atmosphere therein high enough to be forced into the cavity of the tire. The position of the tube 6 will depend upon the amount of tractional depression in the tire, and this, in turn, will be governed by the normal pressure carried therein. Therefore, the bottom 7 of the groove 5,—see drawings—will be so placed with respect to the tractional surface 4' of the tire, that the tube will be partially compressed—as a normal working condition—reducing the volume, and, in consequence, increasing the pressure therein, up to a point just under the amount with which the tire was originally charged, so that, any loss therein, will increase tractional depression to the extent of still further compressing tube 6, until the pressure therein exceeds that in the tire.

The tube 6 can be made available for the purpose of resupplying the tire with air only when it is placed between two non yielding surfaces or anvils, so that, if necessary, it can be fully compressed without injury to the tire, or, compressed at a point close to its normal depression. In this case the rim of the wheel forms one of the anvils, and the ground, the other.

Referring to Fig. 1, wherein the wheel is supposed to be moving in the direction of the arrow a, the tube 6 being filled with air at the normal pressure, admitted as before mentioned through nozzle 7 while the normal working pressure in tire 4 is—as stated—about forty pounds, will permit the outer surface 4, when it strikes the ground, to be depressed far enough to reduce the internal area of the tube 6, and, in consequence, raise the pressure therein to a point just under forty pounds. Now, when the pressure of the tire falls below that point, the tube will be correspondingly compressed, raising the pressure therein above that within the tire. Once this greater compression begins, the air will be forced along the tube by the continued ground traction of the tire, and, at the completion of the revolution of the wheel, will be ejected through aperture 14 into the cavity A of the tire. See Figs. 1 and 5. Each revolution forcing in but a small quantity at a time, will maintain the pressure therein up to the normal working point. In some cases I may find it advantageous to erect the rib or projection 15 on the inner wall of the tire,—see Fig. 3—to assist in compressing the tube 6.

I do not wish to be confined to the exact position of the tube 6 so long as it is capable of a full compression, and to accomplish this by means of the depressed tire. It could be made in short sections; but I prefer one long section extending entirely around the tire.

Having thus described my invention, what I claim as new and desire to secure by Letters Patent, is;

1. The herein described improvement in bicycles, comprising in combination a metal rim, a pneumatic tire; a flexible air tube arranged circumferentially above the same, one end opening to the outer air, the other or discharge end opening into the cavity of the tire, said air tube adapted to be compressed by the yielding tread of the tire, and the air forced therefrom, and into said cavity, substantially as set forth.

2. The combination with a metal rim and a pneumatic tire, of a flexible air tube placed between the two and circumferential therewith, one end opening to the outer air, the other or discharging end opening into the cavity of the tire; said tube so arranged that it may be compressed by the yielding tread of the tire and the air forced therefrom into the cavity of the tire, substantially as described.

3. The combination with a metal rim and a pneumatic tire, of a flexible air tube placed between the two and circumferential therewith, one end projecting without the tire and provided with a dust proof air nozzle, the other end having a valve opening into the cavity of the tire, substantially as shown; said tire and rim so constructed with respect to the position of the air tube that the latter will be compressed by the yielding tread of the tire and the air forced therefrom into the cavity of said tire, substantially as set forth.

4. The herein described improvement in bicycles, comprising in combination, a metal rim, a rib or bead projecting above the outer surface and circumferential with such rim, a pneumatic tire having a circumferential groove or depression in one side, and extending into its cavity to receive the rib of the rim, a flexible air tube placed between the bottom of said groove and the upper surface of the rib of the rim, one end of said tube opening to the atmosphere and having on such projecting end means substantially as shown for the admission of air and exclusion of dust, the other or discharging end provided with a valve, and opening into the cavity of the tire; said tube adapted to be compressed by the yielding tread of the tire and the air forced therefrom into the cavity of the said tire, as set forth.

5. The combination with a yielding hollow tire and a metal rim, of a flexible air tube arranged circumferentially about the same, one end opening to the atmosphere, the other or discharging end opening into the cavity of the tire, said tube adapted to be compressed by the yielding tread of the tire, so that the air will be expelled therefrom into the cavity of said tire, substantially as described.

Signed at New Haven, in the county of New Haven and State of Connecticut, this 2d day of July, A. D. 1892.

JOSEPH P. LAVIGNE.

Witnesses:
JOSEPH SHELDON,
SAVILIAN R. HULL.